United States Patent
Horiguchi et al.

(10) Patent No.: US 6,238,814 B1
(45) Date of Patent: May 29, 2001

(54) FUEL CELL SYSTEM

(75) Inventors: Munehisa Horiguchi; Masataka Ueno; Noriyuki Takada, all of Hokkaido (JP)

(73) Assignee: KabushikiKaisha Equos Research (JP)

( * ) Notice: Subject to any disclaimer, the term of this patent is extended or adjusted under 35 U.S.C. 154(b) by 0 days.

(21) Appl. No.: 09/215,320

(22) Filed: Dec. 18, 1998

(30) Foreign Application Priority Data

Dec. 22, 1997 (JP) .................................................... 9-365850
Mar. 2, 1998 (JP) ................................................. 10-067885
Aug. 10, 1998 (JP) ............................................... 10-225785

(51) Int. Cl.$^7$ .................................................. H02M 8/02
(52) U.S. Cl. .............................................. 429/12; 429/20
(58) Field of Search ................................. 429/12, 19, 20; 423/658.2

(56) References Cited

U.S. PATENT DOCUMENTS

| | | | |
|---|---|---|---|
| 4,000,003 | * 12/1976 | Baker et al. | |
| 4,324,844 | * 4/1982 | Kothmann | 429/26 |
| 4,585,708 | 4/1986 | Abens et al. | 429/17 |
| 4,826,741 | * 5/1989 | Adlhart et al. | 429/19 |
| 5,085,949 | 2/1992 | Sanderson et al. | 429/23 |
| 5,139,894 | 8/1992 | Mizuno et al. | 429/9 |
| 5,316,870 | 5/1994 | Ohga | 429/24 |
| 5,360,461 | * 11/1994 | Meinzer | 423/658.2 X |
| 5,432,020 | * 7/1995 | Fleck | 429/19 X |
| 5,434,016 | * 7/1995 | Benz et al. | 429/19 X |
| 5,441,819 | 8/1995 | Voss et al. | 429/13 |
| 5,645,950 | * 7/1997 | Benz et al. | 429/13 |
| 5,766,786 | 6/1998 | Fleck et al. | 429/17 |
| 5,958,613 | * 9/1999 | Kamada et al. | 429/26 |
| 6,013,385 | 1/2000 | DuBose | 429/17 |

FOREIGN PATENT DOCUMENTS

| | | |
|---|---|---|
| 301757 | 2/1989 | (EP) . |
| 817298 | 2/1989 | (EP) . |
| 59-117074 | 7/1984 | (JP) . |
| 5-054900 | 3/1993 | (JP) . |
| 6-338338 | 12/1994 | (JP) . |
| 7-14599 | 1/1995 | (JP) . |
| 7-220746 | 8/1995 | (JP) . |
| 7-263010 | 10/1995 | (JP) . |
| 8-96818 | 4/1996 | (JP) . |
| 9-266004 | 10/1997 | (JP) . |
| 10-172593 | 6/1998 | (JP) . |
| 10-247505 | 9/1998 | (JP) . |
| 10-255828 | 9/1998 | (JP) . |
| 11-135133 | 5/1999 | (JP) . |
| 11-162490 | 6/1999 | (JP) . |
| 11-191456 | 7/1999 | (JP) . |
| 95/25357 | 9/1995 | (WO) . |
| 98/45889 | 10/1998 | (WO) . |
| 99/05740 | 2/1999 | (WO) . |

OTHER PUBLICATIONS

Nguyen, T.V. et al: "A Water and Heat Management Model for Proton–Exchange–Membrane Fuel Cells" Journal of Electrochemical Society, vol. 140, No. 8, Aug. 1, 1993.
Patent Abstracts of Japan vol. 009, No. 295 (E–360) Nov. 21, 1985.
Patent Abstracts of Japan vol. 199, No.809, Jul. 31, 1998.

* cited by examiner

Primary Examiner—Stephen Kalafut
(74) Attorney, Agent, or Firm—Lorusso & Loud

(57) ABSTRACT

A fuel cell power generating apparatus (1) using a fuel cell stack (2) includes an air intake manifold (45) mounted above the stack for supplying air to a plurality of longitudinally extending air flow passages of fuel cells in stack; one or more of nozzles (55) mounted to side walls of THE air intake manifold for injecting water into the air intake manifold; and water supply system (50) for supplying water to the nozzles. In a preferable embodiment, the nozzles are mounted respectively to a pair of opposite side walls of the air intake manifold at location offset to each other or at different angle of water injection, to facilitate complete dispersion or distribution of water over the entirety of the air intake manifold, which allows smooth entry of the sprayed water to the respective air flow passages of the fuel cells.

13 Claims, 7 Drawing Sheets

FUEL CELL SYSTEM

BACKGROUND OF THE INVENTION

1. Field of the Invention

The present invention relates to a fuel cell system and more particularly to a fuel cell system using a proton exchange membrane as an electrolyte.

2. Description of the Prior Art

A proton exchange membrane fuel cell comprises a proton exchange membrane (PEM) between two electrodes, that is a cathode to which an oxidizing gas is supplied and an anode to which fuel gas is supplied. PEM acts as an electrolyte and transports therethrough hydrogen ions obtained at the anode of the fuel cell toward the cathode, in the form of proton ($H^+$). Each of the electrodes comprises a catalyst layer deposited on a porous base member through which the reactant gas is supplied. Mounted externally of each electrode is a separator or connector plate with grooves permitting the reactant gas to be introduced into the electrode at a constant flow rate. Excess gas which has not been consumed by the fuel cell reaction is exhausted to the open air through the grooved separator. The electricity generated by the energy conversion reaction at the anode is collected at the electrode porous base member and transported to the outside of the fuel cell system through the separator. In actual application, the system includes a plurality of fuel cells which are stacked in series with the separator being interposed between adjacent fuel cells.

Since the fuel cell generates heat in correspondence to the electric power generated, a fuel cell stack 2 usually includes cooling plates 803 between fuel cells 801, 801 at predetermined intervals, as shown in FIG. 9. Each cooling plate has a passage of a cooling medium such as air and water to prevent excessive overheat of fuel cells 801 in operation.

Proton is hydrated when being transferred through PEM electrolyte, so that PEM tends to be dehydrated as the fuel cell reaction proceeds. PEM must always be properly humidified to prevent decrease of ion-conductivity and energy conversion efficiency. In the conventional designs, hydrogen gas is humidified by suitable means which, in turn, humidifies the PEM when it is supplied to the anode.

Various attempts have also been proposed to humidify air to be supplied to the cathode. Since the cathode of the fuel cell in operation has been heated to 80° C., for example, the air of a normal temperature should be preheated by a humidifier so that its saturated vapor becomes consistent with the ambient vapor condition of the cathode. Such a humidifier that is required to have water supplying function and air preheating function can not be simple in construction.

In Japanese patent un-examined publication No. 7-14599, there is provided a water injection nozzle to inject a necessary quantity of water into an air introducing pipe through which an air is supplied to the cathode of the PEM fuel cell. Since the nozzle is located upstream of a compressor, liquid water injected from the nozzle is evaporated when subjected to heat generated by the compressor. Thus, the cathode is humidified by vapor, not by liquid water.

In the fuel cell system of Japanese patent un-examined publication No. 9-266004, a discharge gas from the anode containing hydrogen gas which has not been consumed during the anodic reaction is introduced into the cathode where the unconsumed hydrogen gas in the discharge gas is combusted with oxygen to generate water, which well humidifies PEM electrolyte. In this system, there is no need to install a humidifier for humidifying air to be supplied to the cathode.

During operation of the fuel cell system, a proton produced at the anode is moved to the cathode where it reacts with oxygen in the air or any other oxidizing gas supplied thereto to produce water. Accordingly, in accordance with the conventional recognition in the art, there is a greater need to humidify hydrogen gas to be supplied to the anode, than at the cathode where water can at least partially be self-sustaining.

As a result of the inventors' repeated tests and investigation, however, it has been found that water produced at the cathode permeates through PEM electrolyte toward the anode, which makes it unnecessary to humidify hydrogen gas to be supplied to the anode. On the other hand, a water content of the PEM electrolyte at the cathode side tends to decrease by contacting the air flow the cathode. Such finding is contradictory to the conventional knowledge and has been first recognized by the present inventors.

SUMMARY OF THE INVENTION

It is an object of the present invention to provide a fuel cell system, based on the above-described finding, which is capable of maintaining a proton exchange membrane to be in a suitable moist condition.

Another object of the present invention is to provide a fuel cell system which is simple in construction, small in size, easy to install and, therefore, particularly suitable to be mounted on a vehicle.

Still another object of the present invention is to smoothly and effectively supply liquid water to the surfaces of the cathodes in the respective fuel cells in a fuel cell stack.

According to an aspect of the present invention there is provided a fuel cell system in which water is supplied to the surface of the cathode not in a vapor state but in a liquid state. Thus, the fuel cell system of the present invention comprises a stack of a plurality of fuel cells each having an anode, a cathode and an electrolyte membrane interposed between the anode and the cathode; an air intake manifold mounted above the stack for supplying air to a plurality of longitudinally extending air flow passages of the fuel cells in the stack; one or more of nozzle means mounted to side walls of the air intake manifold for injecting water into the air intake manifold; and water supply means for supplying water to the nozzle means.

Liquid water supplied to the air intake manifold above the fuel cell stack will preferentially take latent heat from the air around the cathode to prevent water evaporation from the electrolyte membrane which, therefore, remains in a suitable and uniformly moist condition. This contributes to improvement of capacity and durability of the fuel cell system. Supply of the liquid water is also effective to cool the cathode which would otherwise be overheated to an excessive temperature, which means that the temperature of the fuel cell of the present invention may be controlled without need to use cooling plates. Mounting of the nozzle means to the side wall of the air intake manifold will prevent increase of the overall height of the fuel cell system, which is especially important when the system is mounted in a vehicle.

In a preferred embodiment of the present invention, the nozzle means are mounted respectively to a pair of opposite side walls of the air intake manifold at locations offset to each other. Alternatively, the nozzle means at opposite side walls of the air intake manifold have different angles of water injection. In either embodiment, the sprayed water is uniformly dispersed and distributed over the entire cross-section of the air intake manifold and, therefore, allowed to enter all of the air flow passages of the respective fuel cells mounted below a single air intake manifold.

In another preferred embodiment of the present invention, the air intake manifold has a double side wall structure having an outer side wall and an inner side wall to define therebetween a passage through which water is conveyed to the nozzle means which is mounted to the inner side wall of the air intake manifold for injecting water to a space within the inner side wall. There is a single water passage between outer and inner side walls of the air intake manifold, through which water is supplied to the respective nozzle means.

In another preferred embodiment of the present invention, each of the air flow passages has an enlarged top opening communicatable with the air intake manifold. This facilitates smooth entry of the sprayed water to the respective air flow passages. In a particular design, each of the fuel cells in the stack has a plurality of longitudinally extending partitions between adjacent air flow passages, and each of the partitions is narrowed at a top end portion thereof to define the enlarged top opening of the air flow passage. The top end portion of the partitions may be tapered or rounded.

In accordance with another aspect of the present invention, there is provided a fuel cell system comprising a stack of a plurality of fuel cells each having an anode, a cathode and an electrolyte membrane interposed between the anode and the cathode; an air intake manifold mounted in the vicinity of the stack for supplying air to a plurality of longitudinally extending air flow passages of the fuel cells in the stack; water supply means for supplying water to the air intake manifold; and rotary fan means for dispersing and distributing water supplied by the water supply means to an interior of the air intake manifold. In a preferred embodiment, the rotary fan means comprises one or more air suction fans mounted at an air inlet port of the air intake manifold, and the water supply means opens at a location upstream of the fan in an air flow to the air intake manifold so that water supplied by the water supply means is dispersed and distributed by the fan together with the air flow. The rotary fan creates a negative pressure in the air intake manifold, so that water may be supplied to the air intake manifold with no pump means or with a lower capacity pump means.

In accordance with still another aspect of the present invention, there is provided a fuel cell system comprising a stack of a plurality of fuel cells each having an anode, a cathode and an electrolyte membrane interposed between the anode and the cathode; an air intake manifold mounted in the vicinity of the stack for supplying air to a plurality of longitudinally extending air flow passages of the fuel cells in the stack; water supply means for supplying water to the air intake manifold; air supply means for supplying air to the cathode of each of the fuel cells in the stack; and hydrogen gas supply means for supplying hydrogen gas to the anode of each of the fuel cells in the stack, in which the hydrogen gas supply means includes hydrogen storing alloy that produces hydrogen gas when heated, and heat generating means mounted near the hydrogen storing alloy to be heat-exchangeable with the hydrogen storing alloy. This system utilizes heat exchange between the heat generating means and the hydrogen storing alloy to enhance endothermic reaction of the latter producing hydrogen gas. The heat generating means preferably comprises a DC/DC converter or a motor that is driven by an output from the stack.

BRIEF DESCRIPTION OF THE DRAWINGS

The foregoing and other objects and features of the present invention will be apparent from the following description when read in conjunction with the accompanying drawings in which.

DETAILED DESCRIPTION OF PREFERRED EMBODIMENTS

Figure 1:
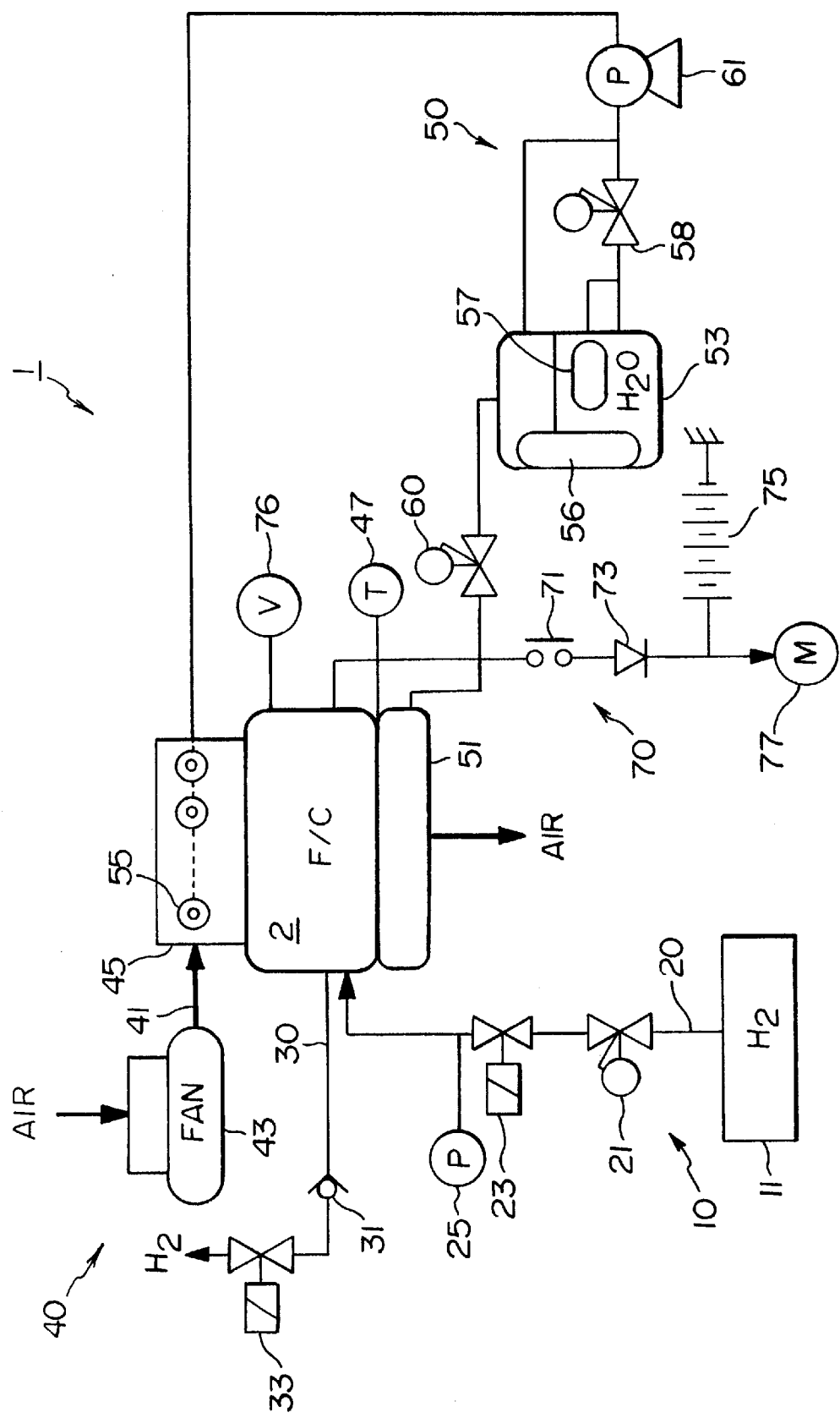
FIG. 1 is a schematic view diagrammatically showing the structure of a fuel cell power generating apparatus embodying the present invention.

FIG. 1 diagrammatically shows the structure of a fuel cell power generating apparatus 1 according to an embodiment of the present invention, which comprises in general a proton exchange electrolyte fuel cell stack 2, a fuel gas supply system 10 including a hydrogen storing alloy 11, an air supply system 40, a water supply system 50 and an output system 70.

Figure 2:
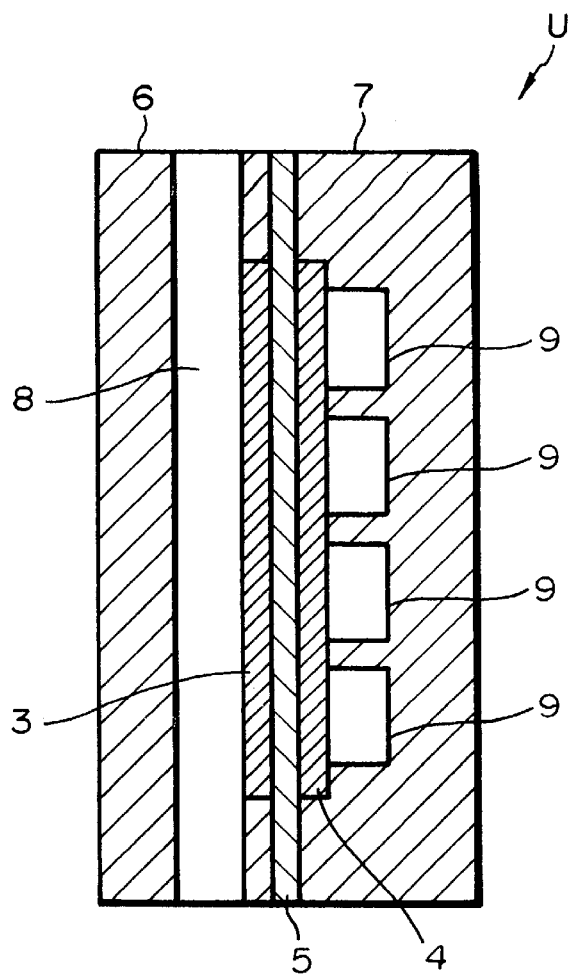
FIG. 2 is a schematic view showing the single fuel cell structure in a apparatus shown in FIG. 1.

Fuel cell stack 2 comprises a plurality of single fuel cell units U connected in series. Shown in FIG. 2 is a structure of single fuel cell unit U which, as is known in the art, comprises an air electrode or cathode 3, a fuel electrode or anode 4, an electrolyte membrane 5 interposed therebetween. Separators 6, 7 of carbon black are provided at both sides of cathode 3 and anode 4 respectively which contact adjacent fuel cell units. Although single fuel cell units U may have various and different structures, in the example of FIG. 2, separator 6 has a plurality of longitudinally extending air flow passages 8 that allow air to flow therethrough in contact with cathode 3, whereas separator 7 has a plurality of transversely extending hydrogen gas flow passages 9 that allow hydrogen gas to flow therethrough in contact with anode 4.

Fuel gas supply system 10 includes a hydrogen storing alloy 11 and a hydrogen gas induction passage 20 through which hydrogen gas released from hydrogen storing alloy 11 is supplied to hydrogen gas flow passages 9 at anodes 4 of respective fuel cell units U in stack 2. Passage 20 has a pressure control valve 21 that is controlled to regulate and reduce the pressure of hydrogen gas from hydrogen storing alloy 11, an electromagnetic valve 23 that is controlled to open and close passage 20, and a pressure sensor 25 of well-known construction that detects the pressure of hydrogen gas supplied to anodes 4 in stack 2. Hydrogen storing alloy such as $LaNi_5$, $TiFe$, $ZrMn_2$ is known as alloy from which hydrogen gas is produced by endothermic reaction. For example, in case of $LaNi_5$, endothermic reaction of $LaNi_5H_6 \rightarrow LaNi_5 + 3H_2$ occurs when heated to about 50–80° C. which produces hydrogen gas at about 300 liters per hour.

Fuel gas supply system 10 includes a hydrogen gas discharge passage 30 with a check valve 31 and an electromagnetic valve 33. Check valve 31 permits one-way gas flow in passage 30 and prevents entry of atmospheric air to anodes 4 in stack 2. Hydrogen gas which has not been consumed and remains at anodes 4 in stack 2 is discharged through passage 30 to the open air. Electromagnetic valve 33 is intermittently driven to achieve perfect combustion of hydrogen with oxygen.

Air supply system 40 introduces the atmospheric air to air flow passage 8 at cathodes 3 of respective fuel cell units U in stack 2, and then discharges air from stack 2 to the open air through condenser 51 where water is separated from the discharged air. System 40 includes an air supply passage 41, with a fan 43, through which the atmospheric air is supplied to an air intake manifold 45 mounted above stack 2, and then through air flow passage 8. In this embodiment, one or more of nozzles 55 are mounted on opposite side walls of air intake manifold 45 for spraying liquid water into the air flowing through manifold 45. Most of the sprayed water reaches condenser 51 still in the liquid state, but a portion thereof evaporates during flowing through stack 2, which portion is condensed by condenser 51 to collect liquid water. The discharge air from cathode 3 may include vapor generated by fuel cell reaction in stack 2, which is also treated by condenser 51 to collect liquid water. The temperature of discharge gas from stack 2, which should be equivalent to the stack temperature, is monitored by a temperature sensor 47.

Water supply system 50 is a substantially closed system in which water in a tank 53 is supplied to air intake manifold 45 through nozzles 55 and water from condenser 51 is returned to tank 53. Because it is practically impossible to design system 50 in a completely closed fashion, there is mounted a water level sensor 56 that constantly monitors a water level in tank 53 and, if the water level is decreased to below a predetermined minimum level, water is supplemented to tank 53. To prevent freezing of water in tank 53, there is mounted a heater 57 and an electromagnetic valve 58. Another electromagnetic valve 60 is mounted to a conduit connected between condenser S1 and tank 53 to prevent evaporation of water in tank 53.

Water in tank 53 is pumped up by a pump 61 and supplied to nozzles 55 which continuously or intermittently sprays water onto the surface of cathodes 3 in stack 2. The sprayed water will preferentially take latent heat from cathode 3 and, therefore, prevent water evaporation or dehydration of electrolyte membrane 5 which remains in a properly moist condition. The sprayed water will also cool cathode 3 to automatically control the temperature of stack 2. No additional cooling medium is required. During operation of stack 2, a control unit (not shown) operates in response to the temperature of the discharge gas, which is detected by sensor 47, to maintain stack 2 within a predetermined appropriate temperature range.

Output system 70 receives the output from stack 2 to drive a motor 77. Output system 70 includes a switch relay 71, a battery 75 and a rectifying diode 73 between relay 71 and battery 75. Battery 75 is provided as an auxiliary power source which supplies power to motor 77 when stack 2 becomes inoperative during driving of a vehicle. The control unit (not shown) operates in response to the output voltage from stack 2, which is constantly monitored by a voltmeter 76, to adjust the degree of opening of electromagnetic valve 33.

Figure 3:
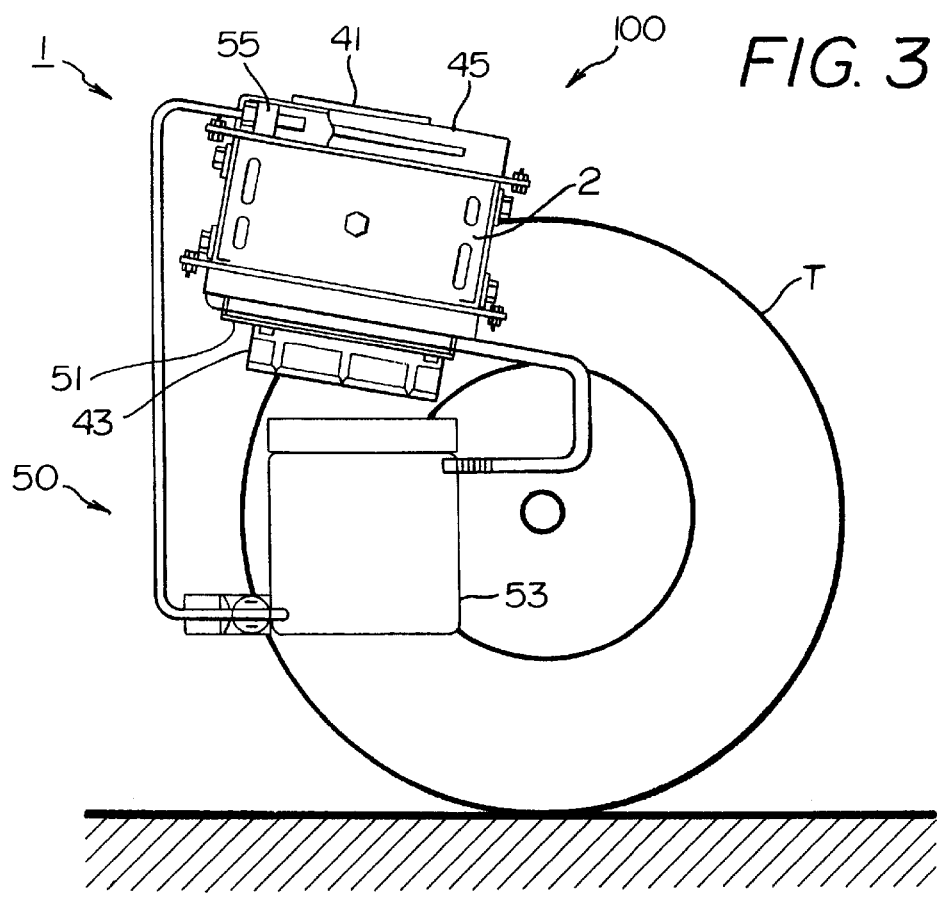
FIG. 3 is a schematic view showing the apparatus of FIG. 1 which is mounted in a vehicle.
Figure 4:
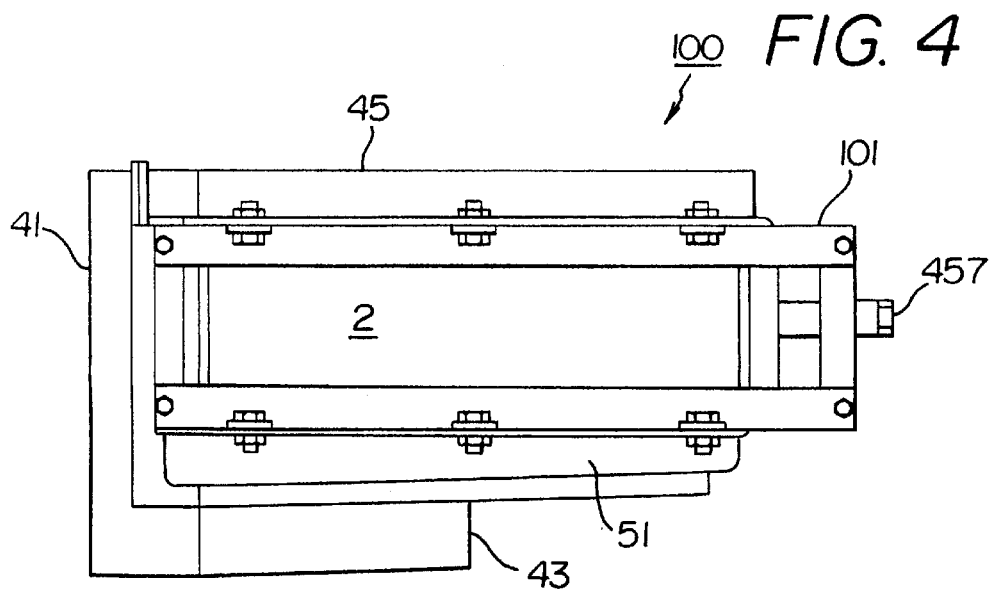
FIG. 4 is a side view of an assembly composed of an air intake manifold, a fuel cell stack, a condenser and an air introducing fan.
Figure 5:
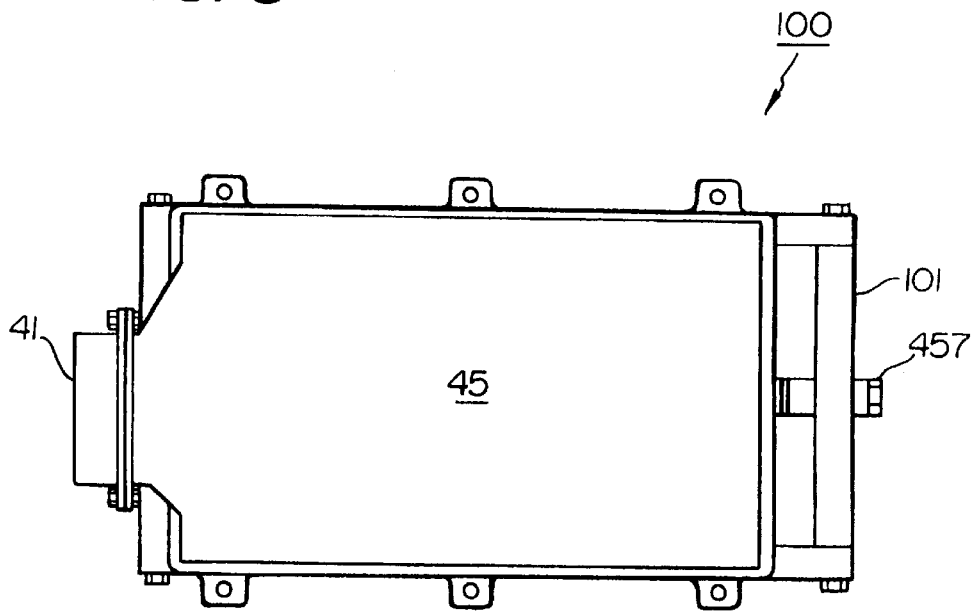
FIG. 5 is a plan view of the assembly of FIG. 4.
Figure 6:
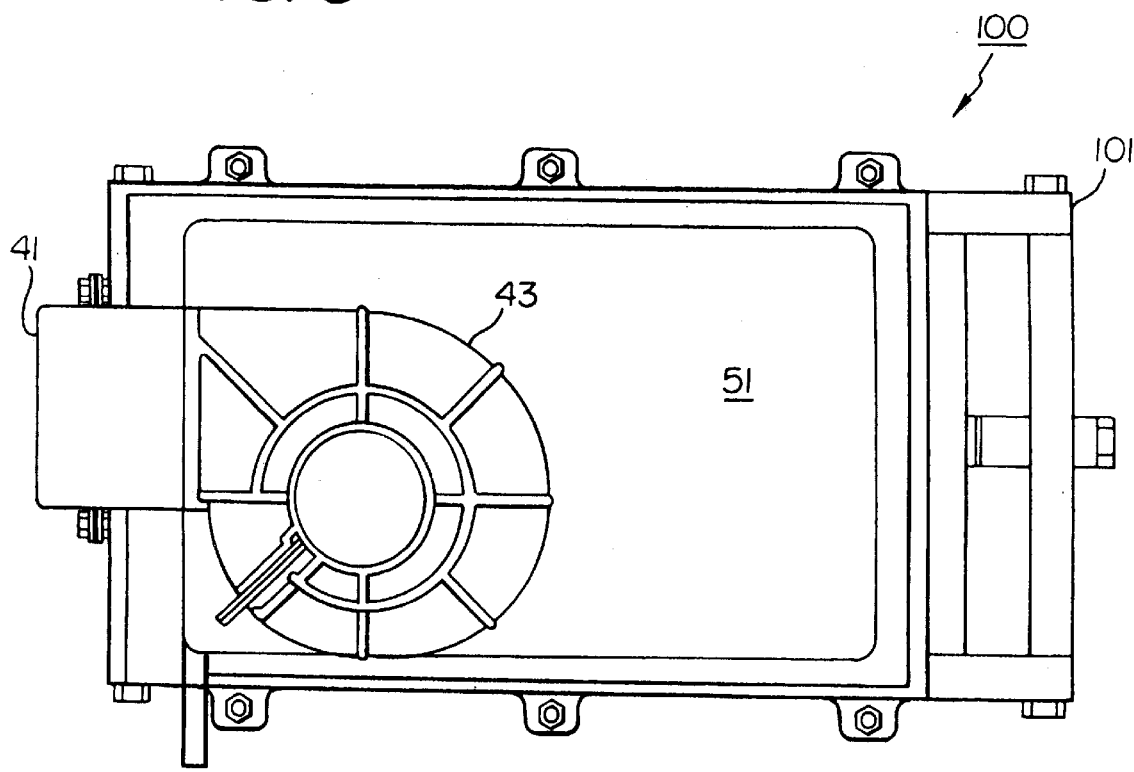
FIG. 6 is a bottom view of the assembly of FIG. 4.
Figure 7:
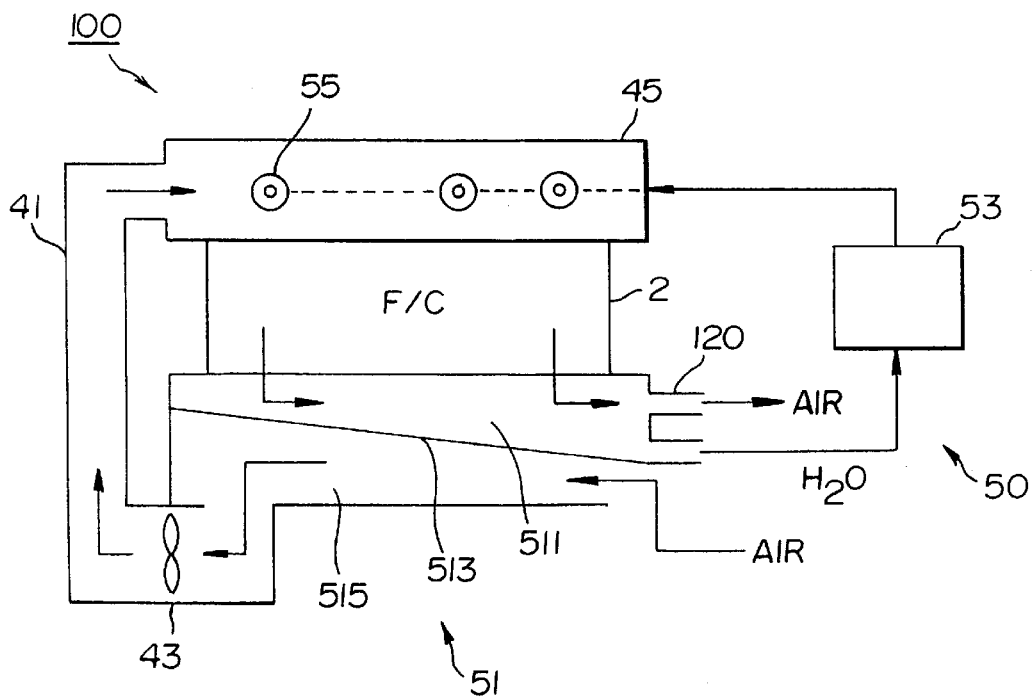
FIG. 7 is a schematic view diagrammatically showing the structure of the assembly of FIG. 4.

FIG. 3 shows apparatus 1 which is mounted on a tire T of a vehicle (not shown), in which an assembly 100 having fuel cell stack 2, air intake manifold 45 above stack 2 and condenser 51 and fan 43 both below stack 2 is supported by a frame 101, as shown in more detail in FIGS. 4–6. In further reference to FIG. 7, the interior of condenser 51 is divided by an inclined partition 513 into an upper discharge chamber 511 and a lower suction chamber 515. Partition 513 is made of heat conductive material such as aluminum to facilitate heat exchange between air in chambers 511 and 515. The discharge gas from stack 2 of a temperature of approximately 50° C., for example, enters chamber 511 where it is cooled by heat exchange with the atmospheric air in port 515 of a considerably lower temperature, and is then discharged to the open air through an exhaust opening 120. When the discharged gas in chamber 515 is subjected to heat exchange, vapor in the discharged gas is condensed into water, which flows down along inclined partition 513 to be discharged through a drain opening 516 at the lower end thereof. Some portion of water sprayed by nozzles 55 which has not been evaporated while flowing through cathode 3 of fuel cell stack 2 will drop down by gravity to chamber 511 of condenser 51, and also flow down along inclined partition 513 toward drain opening 516. Water thus discharged through drain opening 516 is supplied to water tank 53 to form water supply system 50 in which water is circulated.

Figure 8:
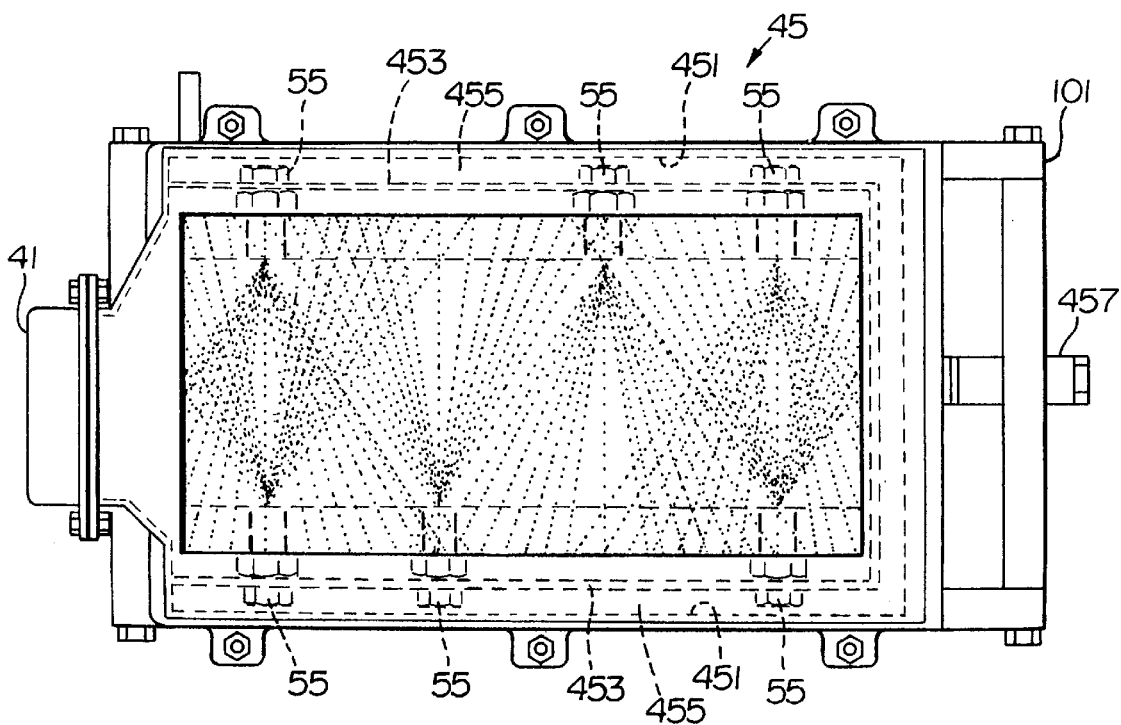
FIG. 8 shows an example of nozzle arrangement in the apparatus of the present invention.

Referring now to FIG. 8, air intake manifold 45 has an outer surrounding wall 451 and inner surrounding wall 453 to define therebetween a water supply passage 455 which is connected by a nipple 457 to water supply system 50. Nozzles 55 are mounted to inner wall 453 at opposite sides thereof, by which water in passage 455 is sprayed toward the interior of air intake manifold 45 by the action of pump 61. In this embodiment, three nozzles are respectively mounted at opposite sides walls 453. More particularly, two nozzles at extreme end positions at one side arc located just in opposition to those at the opposite side, whereas central ones are located offset. Although the angle of water injection from nozzle 55 is restricted (to be approximately 70 degrees, for example, in the embodiment shown in FIG. 8), such offset location of nozzles 55 facilitates even and uniform distribution of the sprayed water toward the cross-section of air intake manifold 45, as shown in FIG. 8, which allows the sprayed water to enter all of the air flow passages of respective fuel cells 10 mounted below a single air intake manifold 45.

Figure 9:
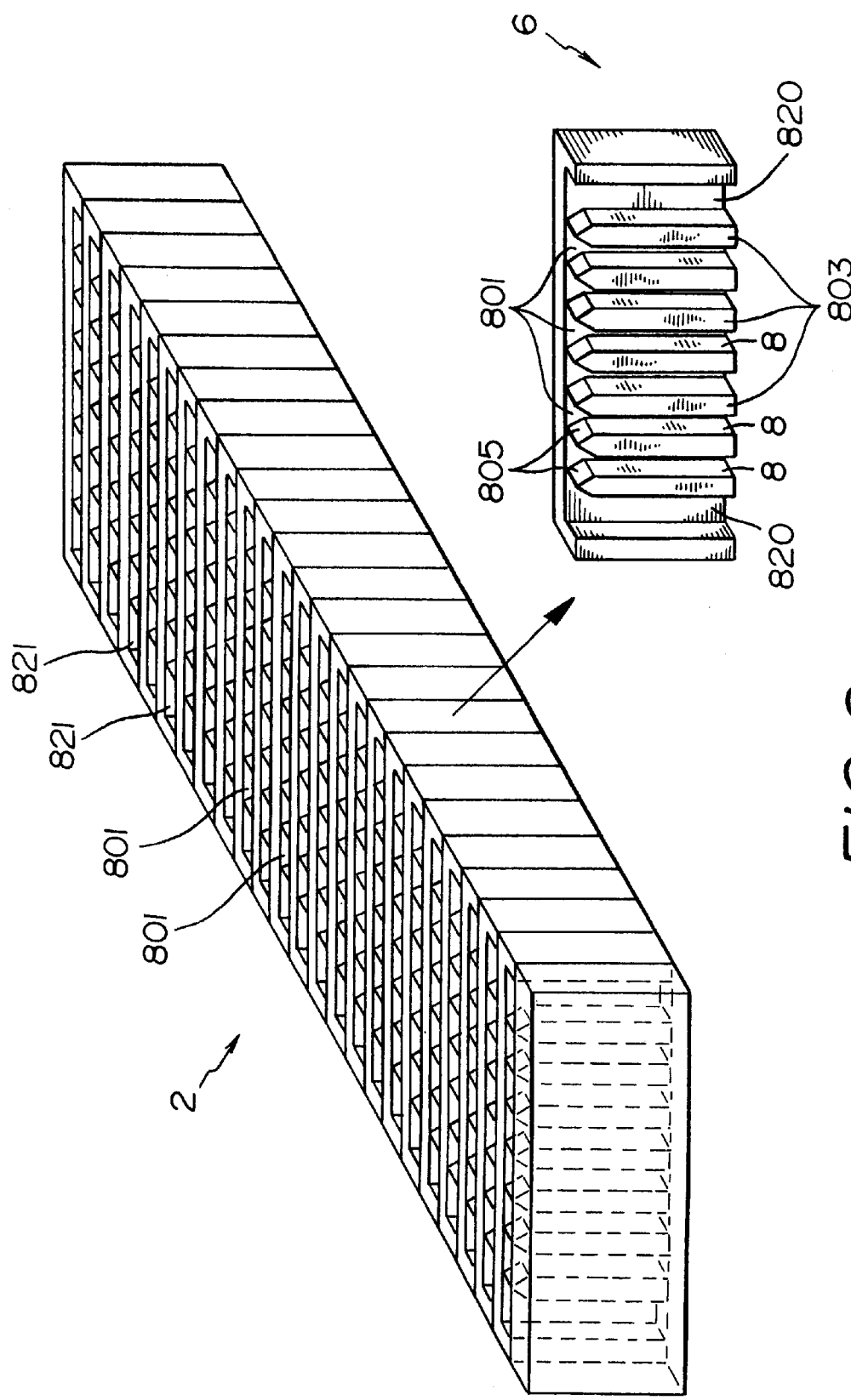
FIG. 9 is a schematic view showing a fuel cell stack and a separator structure thereof.

Referring again to FIG. 2 and further to FIG. 9 showing the structure of fuel cell stack 2 at the air inlet portion thereof, each separator 6 has a plurality of longitudinally extending air flow passages 8 with enlarged top end portions 801. More specifically, each of partitions 803 defining air flow passages 8 therebetween has a pair of tapered top end surfaces 805 to form enlarged top end portion 801 that communicates with the interior of air intake manifold 45 and easily receives water drops injected from nozzles 55. In the example shown in FIG. 9, air flow passages 820 at opposite ends of separator 6 have a width or diameter substantially larger than that of other air flow passages 8 and also have more enlarged top end inlets 821. Such design will compensate for the tendency of the peripheral portion of air intake manifold 45 to receive less water sprayed by nozzles 55, even with such offset location as shown in FIG. 8. Each partition 803 may have one or more bypasses (not shown) for communication between adjacent air flow passages 8.

Figure 10:
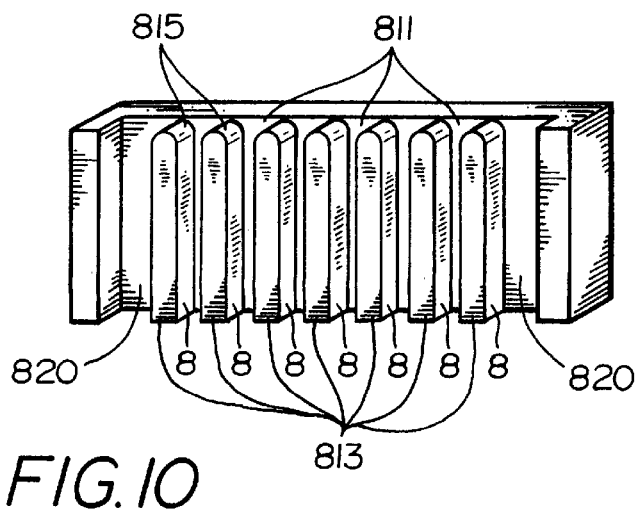
FIG. 10 shows another example of the separator structure.

The shape of partition may be modified as shown in FIG. 10 in which partition 813 has a rounded top end 815 which also forms enlarged top end portions 811 and facilitates entry of the sprayed water to air flow passages 8. The shape of partition 803, 813 may be subjected to a great variety of design. It is important that the top end portion of the respective partitions should be narrowed or tapered as much as possible, which not only contributes to enlargement of the air inlet openings at the top of air flow passages 8 for smooth entry of the sprayed water thereinto, but also prevents water deposition on the top end portions of the partitions which would narrow top end portions 801, 81 land thus could be a bar to entry therethrough of the sprayed water.

Figure 11:
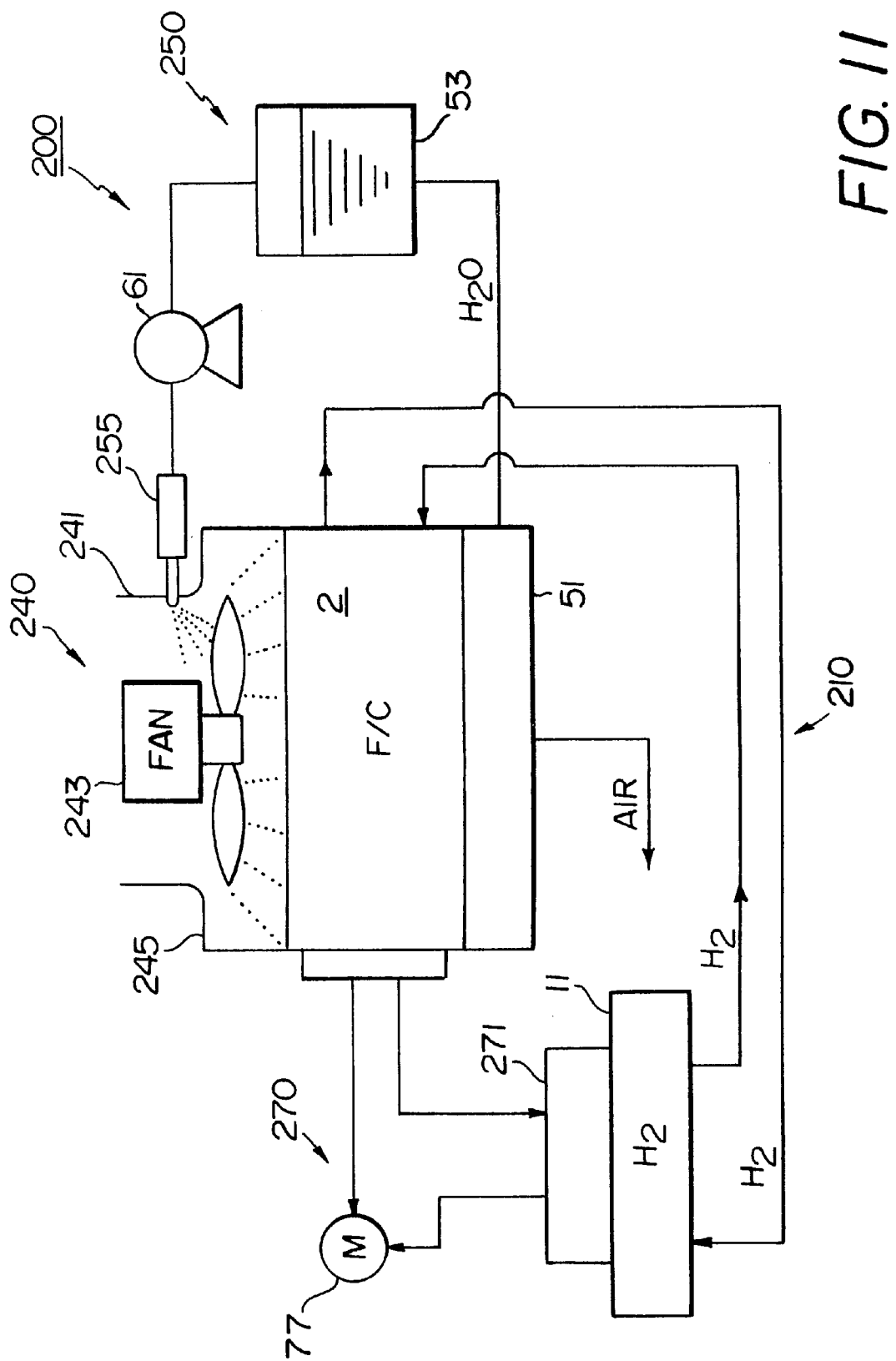
FIG. 11 is a schematic view diagrammatically showing another embodiment of the fuel cell power generating apparatus of the present invention.

FIG. 11 shows another embodiment of a fuel cell system 200 in which identical parts or elements are indicated by identical reference numerals as in the embodiment of FIG. 1. This fuel cell system 200 comprises in general a fuel cell stack 2, a fuel gas supply system 210, an air supply system 240, a water supply system 250 and an output system 270. Fuel gas supply system 210 has substantially the same arrangement as system 10 in FIG. 1, though valves 21, 23 and sensor 25 are not shown in FIG. 11. However, in system 210 of FIG. 11, a heat generating element 271 is mounted in contact with a hydrogen storing alloy 11. Heat exchange between element 271 and hydrogen storing alloy 11 will heat the latter to release hydrogen gas therefrom. Even when additional heater means needs to be mounted to heat alloy 11 to a temperature at which it is activated to release hydrogen gas, the heater means may be of less capacity because it does not operate solely but cooperates with heat generating element 271. Heat generating element 271 may be a control board of a DC/DC converter or motor 77 which is driven by the output from stack 2 itself. From a similar viewpoint of energy conservation in the overall system, it is preferable to heat the tank of hydrogen storing alloy 11 by use of the discharge gas from stack 2 having a temperature higher than the atmospheric air, when such an additional heater means is required.

In this system 200, an air intake fan 243 is mounted at an inlet port of an air intake manifold 245, and one or more of nozzles 255 are arranged so as to spray water into an air supply passage 241 upstream of fan 243 so that the sprayed water is dispersed by fan 243 to be uniformly distributed toward the interior of air intake manifold 245. In this arrangement, it is not always necessary that nozzle 255 sprays water. Nozzle 255 may simply throw water drops which should then be dispersed by fan 243 to achieve substantially the same effect. The rotating fan 243 creates a negative pressure in air supply passage 241, so that water supply system 250 need not include pump 61.

Although the present invention has been described in conjunction with specific embodiments thereof, it is to be understood that it is capable of considerable variation and modification without departure from the scope of the appended claims.

What is claimed is:

1. A fuel cell system comprising:
    a stack of a plurality of fuel cells, each having an anode, a cathode and an electrolyte membrane interposed between said anode and said cathode;
    an air intake manifold defining an open chamber extending across and in direct communication with said stack;
    a plurality of air flow passages extending between upper open ends and lower open ends, said upper open ends opening directly into said open chamber of said air intake manifold for receiving air and for conveying the received air into contact with the cathodes of said fuel cells and then out of said stack; and
    water supply means mounted in said open chamber of said air intake manifold for introducing liquid water droplets directly into said upper open ends of all of said air flow passages, whereby liquid water is carried into contact with said cathodes.

2. A fuel cell system according to claim 1 wherein said anode, said cathode and said electrolyte membrane are in sheet form and are arranged in parallel with said air flow passages.

3. A fuel cell system according to claim 2 wherein said water supply means comprises nozzles mounted within said open chamber, whereby water droplets emanating from said nozzles travel in straight line paths directly into said open upper ends.

4. A fuel cell system according to claim 1 wherein said water supply means comprises nozzles mounted within said open chamber, whereby water droplets emanating from said nozzles travel in straight line paths directly into said open upper ends.

5. A fuel cell system according to claim 1 wherein said air flow passages are straight.

6. A fuel cell system according to claim 1 wherein each of said air flow passages has an enlarged top opening which is in direct communication with said open chamber of said air intake manifold.

7. A fuel cell system according to claim 6 wherein each of said fuel cells in said stack has a plurality of longitudinally extending partitions between each two adjacent air flow passages, each of said partitions being narrowed at a top end portion thereof to define said enlarged top opening of said air flow passage.

8. A fuel cell system according to claim 7 wherein each of said partitions has a tapered or rounded top end portion.

9. A fuel cell system according to claim 2 wherein said air flow passages are straight.

10. A fuel cell system according to claim 1 further comprising:
    hydrogen gas supply means for supplying hydrogen gas to said anode of each of said fuel cells in said stack, said hydrogen gas supply means including hydrogen storing alloy that produces hydrogen gas when heated and heating means for heating said hydrogen storing alloy to produce the hydrogen gas.

11. A fuel cell system according to claim 10 wherein said heat generating means comprises a DC/DC converter or a motor that is driven by energy output from said stack.

12. A fuel cell system according to claim 1 further comprising water dispersion means for distributing said droplets throughout said open chamber in said air intake manifold.

13. A fuel cell system according to claim 12 wherein said water dispersion means comprises a fan.

* * * * *